Nov. 10, 1970  C. P. STANLEY, JR., ET AL  3,538,688

LOWER FILTER ASSEMBLY

Filed June 13, 1968  5 Sheets-Sheet 1

CHARLES P. STANLEY, JR.
HENRY D. BOWEN
INVENTORS.

BY John G. Mills

ATTORNEY.

| United States Patent Office | 3,538,688 |
|---|---|
| | Patented Nov. 10, 1970 |

3,538,688
LOWER FILTER ASSEMBLY
Charles P. Stanley, Jr., and Henry D. Bowen, Raleigh, N.C., assignors to Aeroglide Corporation, Raleigh, N.C., a corporation of North Carolina
Filed June 13, 1968, Ser. No. 736,807
Int. Cl. B01d 45/04
U.S. Cl. 55—418                                       8 Claims

ABSTRACT OF THE DISCLOSURE

An apparatus comprising a conduit provided with progressively sized louvered filters having progressively spaced louvers in the louvered walls whereby approximately the same volume of air will enter each of the filters.

---

The present invention relates to filters and more particularly to high volume filter systems used in air pollution control.

In the past, drying systems such as grain driers, charcoal driers and the like have vented their exhaust gases directly into the atmosphere. This air at all times contains air borne particles of varying size and weight and in varying densities depending upon how clean the product being processed is when it is placed in the drier. Due to the nuisance factor of having an accumulation of large quantities of these impurities scattered over a wide area around high volume driers, some attempts have been made to either filter the exhaust gases or to concentrate and collect the impurities therefrom. These attempts have included large cage like screens, series of cyclone type collectors and other similar systems.

In recent years, an added factor of Government regulation for the control of air pollution has been an additional prodding factor in necessitating the elimination of as much of the air borne impurities as possible. Even these regulations, however, are usually based on particulate weight per cubic foot of exhausted air. As presently written, a high volume commerical grain drier could come well within the regulations and still have an accumulation of light weight bran several inches thick extending several hundred feet from the exhaust port. Thus a nuisance factor still remains although the Government regulations have cleaned the ambient air somewhat.

Due to the increasingly more stringent Government regulations for air pollution control and to reduce the nuisance factor caused by drier exhausts, applicants have undertaken a vigorous research program to discover the most advantageous way to overcome these problems. After carefully considering the factors involved including space limitations, the percentage of cleaning necessary and the high volume of air being dealt with, a greatly improved louver type particle separator or filter has been developed as the present invention. In a typical installation with the filter device taking up an area having dimensions of approximately four feet by four feet by four feet, better than 95 percent of all foreign matter can be removed from the 100,000 cubic feet per minute exhaust being emitted from a 1,000 bushel per hour capacity grain drier. This is a higher percentage of removal than has heretofore been possible and is accomplished with a much smaller and much simpler system than has ever been used for air pollution control of large volume exhausts.

It is an object, therefore, of the present invention to provide a high air volume drier in combination with louver type filter means.

Another object of the present invention is to provide, in combination with a drying type device, a means to either segregate recovered particles or to mix the same with the dried product.

Another object of the present invention is to provide a means to recover at least 95 percent of all air borne particles in the exhaust air flow from a grain type drying system.

A further object of the present invention is to provide a louver type particle separator and collector system used in conjunction with high air volume driers which will capture the majority of air borne particles having a diameter of 10 microns or larger.

Another object of the present invention is to provide a louver type filter device having wider openings between the louvers near the air entrance opening than adjacent the particle exit opening.

An additional object of the present invention is to provide means to reduce static or back pressure from developing at the particle exit opening in a louver type filter means.

Another object of the present invention is to provide means to adjust a filter device of the louver type for maximum particle concentration for the size particles and air volume being handled.

Another object of the present invention is to provide an arrangement of inner connection between a multiplicity of louver type filter unit to reduce a high volume, high pressure polluted air stream into a highly concentrated, low pressure, low volume, air stream.

Other objects and advantages of the present invention will become apparent and obvious from a study of the following description and the accompanying drawings which are merely illustrative of the present invention.

Figure 1:
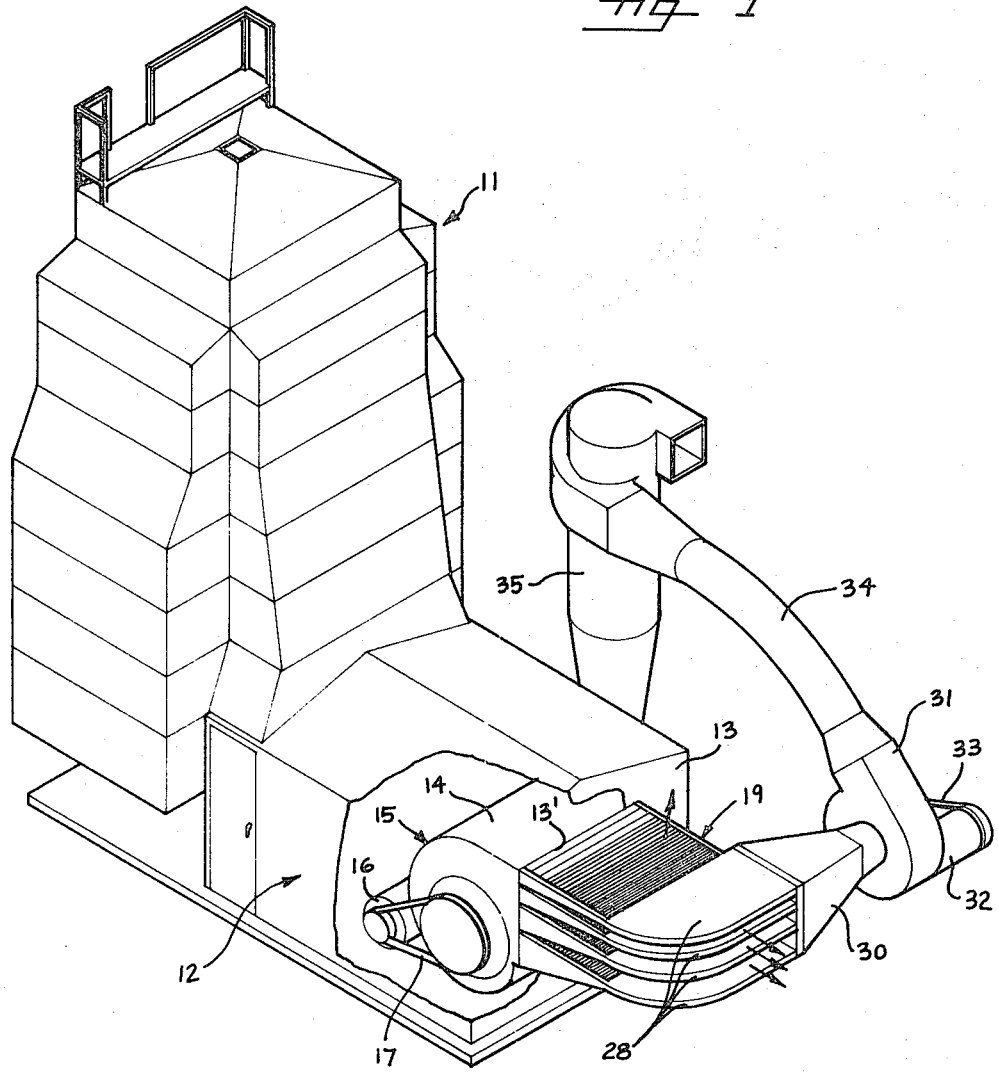
FIG. 1 is a perspective showing of the present invention installed in operative arrangement with the exhaust port of a grain type drier.

With further reference to the drawings, a common grain type drier which operates on the induced draft principle is indicated generally at 11. On one side of this drier is connected an air tight housing 12 which communicates with the interior of the drier.

The end of wall 13 of the housing 12 has a rectangular opening 13' therein about which is sealingly secured the fan blower casing 14 of a fan blower indicated generally at 15.

To draw heated ambient air through the drier superstructure to accomplish the desired drying process and to exhaust such air from the system through the opening or port 13', a motor 16 is operatively attached to the fan blower by means of belt 17. Thus it can be seen that in the normal operation of an induced draft type drier the air is sucked in through ports (not shown), is heated by means (not shown), is circulated through the drier and is exhausted through opening 13' by fan blower 15.

In the type of drying system hereinabove described, as well as in the type of system where the blower is at the entrance to form what is commonly called a forced air or forced draft type drier, the air that has been heated and forced through the material being dried is laden with foreign material or particles when it is carried into the ambient air as an exhaust gas. This exhausted foreign matter has been the source of complaint as a nuisance factor since it is deposited around the drier and over a period of time builds up a thick layer which can decay and give off a very pungent odor. Also large clouds of these impurities can literally choke the air for great distances. These clouds have become the subject of air pollution studies and regulations. To eliminate these problems, a mounting flange of slightly larger dimensions than the opening 13 is mounted over such opening and carries a series of filter or concentrator units indicated generally at 19.

Each of these units is composed of a generally channeled shaped imperforate portion which may be referred to, as oriented in the drawings, as sides 20 and 21 and bottom 22. In the open area opposite bottom 22 are disposed a plurality of louver means 23 to form a tapered, tunnel like passage which is wider at its entrance 24 adjacent opening 13' than at its exit 25. The purpose of this tapering and the openings will be hereinafter described in more detail.

Figure 2:
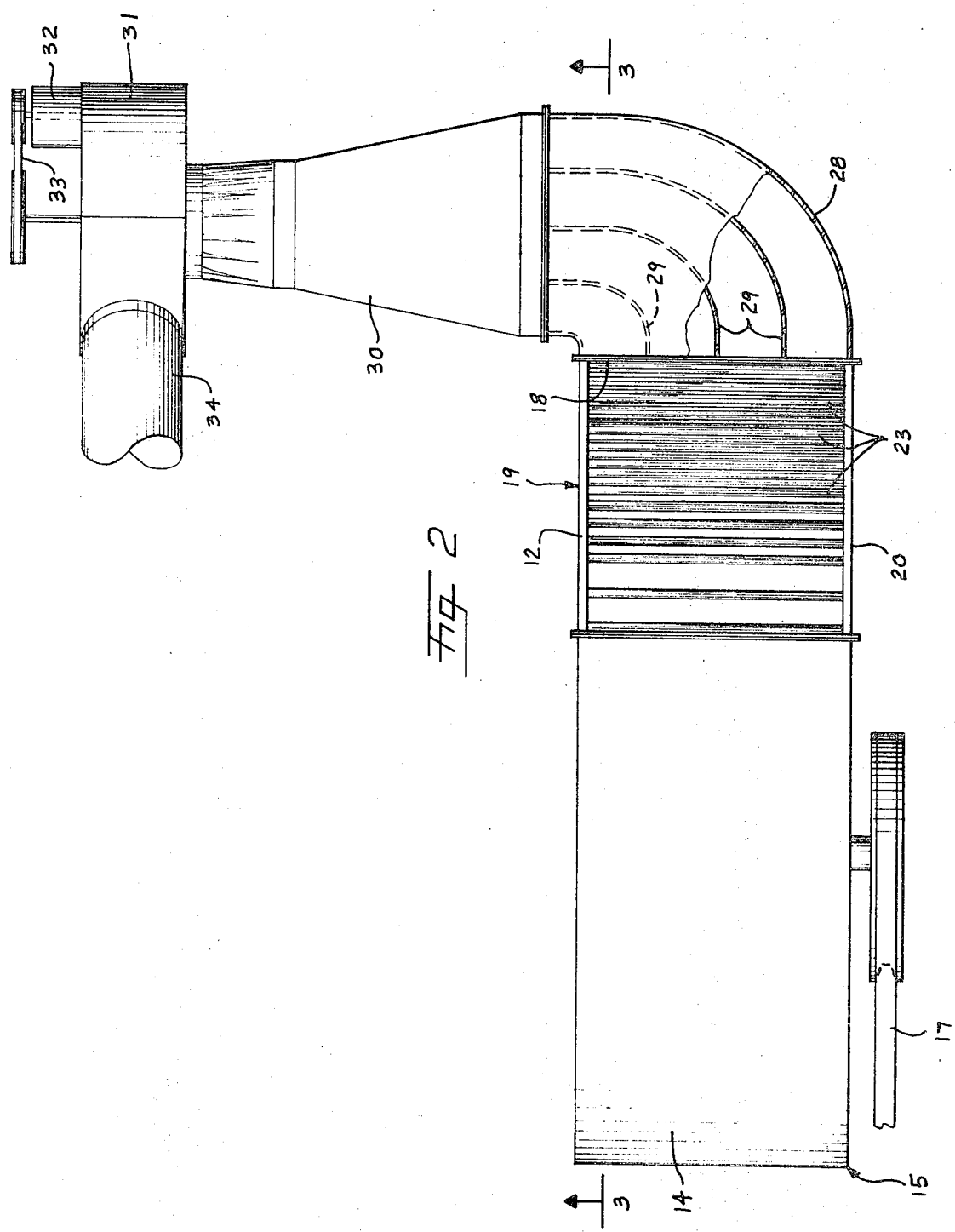
FIG. 2 is a top plan view of the particle separator means of the present invention.
Figure 3:
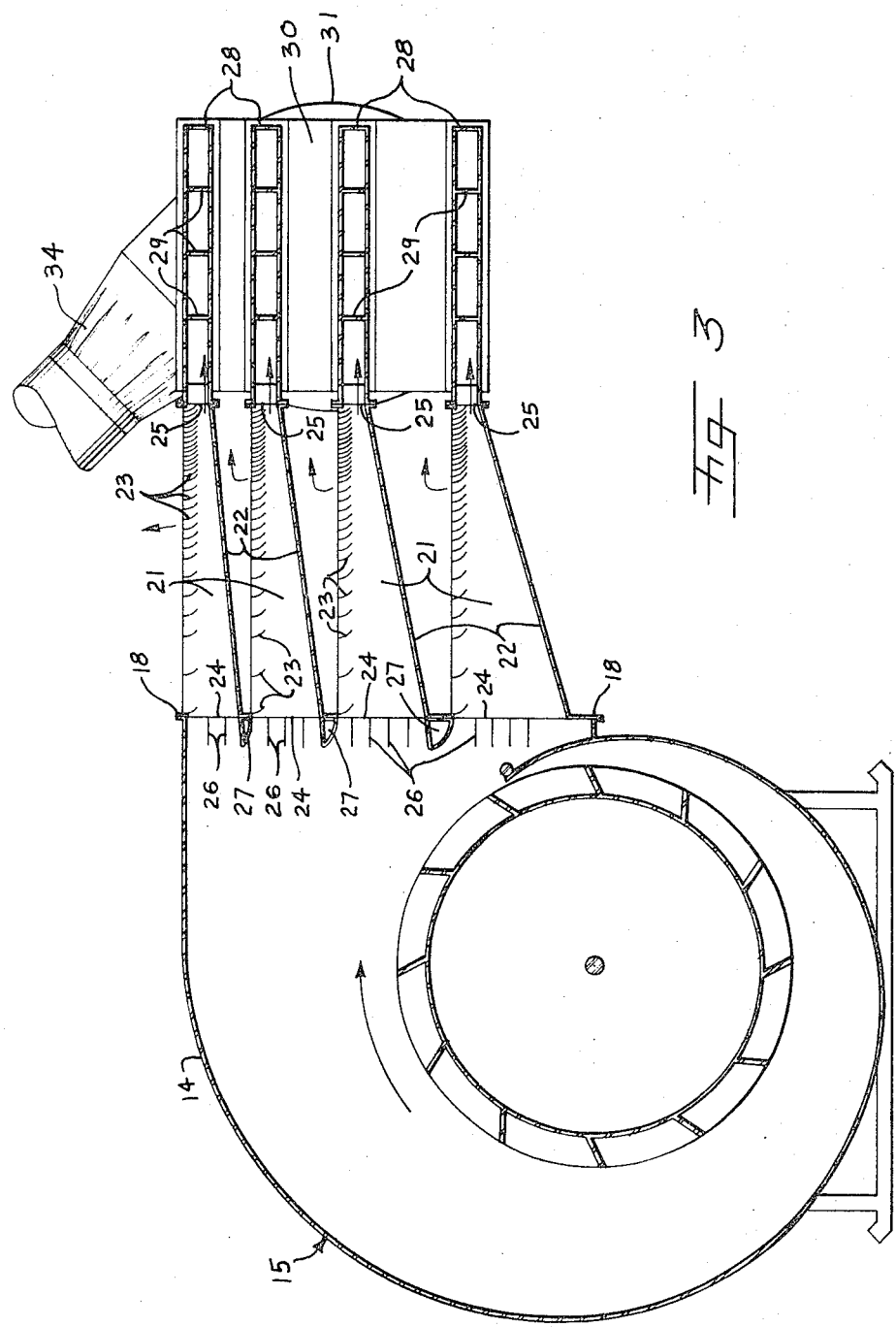
FIG. 3 is a sectional view taken through lines 3—3 of FIG. 2.
Figure 4:
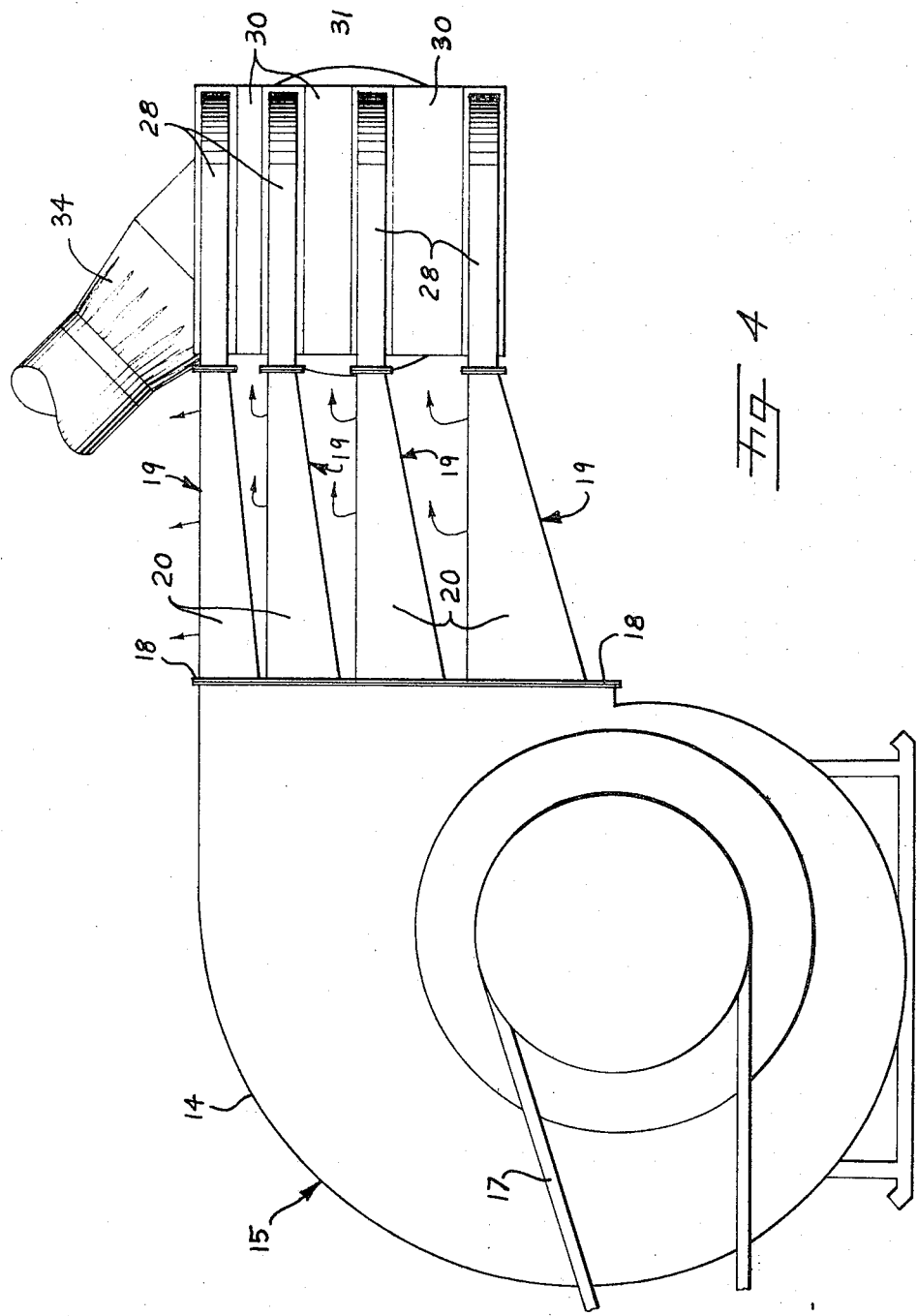
FIG. 4 is a side elevational view of louver portion of the present invention.

It should be noted, particularly in FIG. 2, that the spaces between the louvers progressively increase from exit 25 to entrance 24. In the typical arrangement shown, the first quarter, moving from the exit opening 24 toward the entrance 25, has its louvers spaced at equal intervals. The louvers spaced in the second quarter are at intervals double those of the first quarter. The intervals in the third quarter are equal to every third interval of the first quarter and the intervals of the fourth quarter are equal to every fourth interval of the first quarter. The purpose of this progressively varying spacing will be hereinafter dealt with in more detail.

It should also be noted that, as oriented in the drawings, the uppermost of units has the narrowest entrance opening 24 while the unit just below the upper unit is slightly wider and the one below that is even wider with the bottom unit being the widest of all. The reason for this arrangement is that in a fan blower of the type disclosed, the greatest quantity of air is exhausted adjacent the outer casing. The filter units of the present invention have been so designed that each unit, when in operation, handles approximately the same volume of air as each other unit thus giving a uniform air exhaust. If it is desired to maintain this uniform air exhaust without varying the overall sizes of the units, wider louver spacing can be used in the units further away from the outer casing. The reason this arrangement is possible is that, due to centrifugal force, the highest concentration of particles are found adjacent the outer casing, thus requiring tighter louver spacing in this area to maintain a high incident of particle recovery.

To eliminate turbulence and to assure constant anticipatible results, a series of air straighteners 26 may be disposed in or adjacent the entrance opening 24 of each of the units 19. These straighteners extend laterally across the openings between the imperforate side portions. Also, to control and reduce entrance turbulence, laterally disposed wedged shaped members 27 are secured in the area between the units 19 in parallel relationship to the air straighteners 26.

Each of the units 19 has secured to its exhaust opening 25 an enclosed particle channel 28 which, through the action of a multiplicity of wall like partition members 29, channels the impurity laden flow from said unit into a funnel shaped combining structure 30. Although it is certainly not necessary, the exhaust channels as seen in the drawings change the direction of flow of the exhaust fluid from each of the concentrating units 90 degrees. The purpose of this change in direction of flow is to conserve ground space which in many instances around grain elevators and their associated driers is very limited.

Operatively connected to the smaller end of the funnel shaped combining structure 30 is a fan blower unit 31. This unit is operatively connected to a motor 32 by way of belt 33.

To the exhaust side of blower unit 31 is connected a pipe 34 which leads into a cyclone type separator for collecting the particles which have been removed from the exhaust gases of the drier. If desired, of course, pipe 34 could be used to return the recovered particles to the drier or to the elevator where the dried grain is being stored.

OPERATION

In actual operation of air cleaning device of the present invention, the drying process is placed in operation by starting motor 16 which activates blower 15. Air is thus forced by induction through the superstructure of drier 11 and is exhausted through opening 13'. As the air passes through such opening, it is divided into four separate channels or passageways by wedges 27. These passageways are of varying sizes but each is adapted to accommodate approximately the same volume of air as each of the others as heretofore described. As the air passes from the opening 13' into the entrance openings 24 of the filter or concentrator units 19, any turbulence in such air is reduced or eliminated by the air straighteners 26.

As the impurity laden exhaust air enters the units 19, it tends to take the path of least resistance and make an abrupt angular turn to pass out of the openings between the louvers 23. The particles carried by this exhaust air, by momentum, tend to continue in a straight line. When the particles do tend to follow the major air flow and come into contact with the louvers, such louvers' curved shape causes such particles to bounce or ricochet back into the air stream that is flowing longitudinally through the unit 19.

Because the air is traveling its straightest and fastest when it first enters the concentrator unit, fewer louvers in this area are necessary to prevent the escape of the air borne impurity particles. As the air is disbursed, the velocity drops thereby allowing, among other things, the tapering of the unit toward an exit that is smaller than the entrance. Research has disclosed that the most beneficial results can be obtained by removing as much air as possible close to the entrance of the unit by having as few louvers as has been experimentally proven practical while increasing the number of louvers to a large number of narrowly spaced ones near the exit 25. This narrow spacing is, of course, necessary due to the drop in velocity of the particles passing through the unit. Thus it can be seen that a majority of the exhaust air passing through opening 13' is exhausted into the atmosphere as indicated by the arrows on the figures.

The small amount of the exhaust air or gas which is not exhausted between the louvers is heavily laden with impurities and passes into the respective exhaust channels 28 of the various units 19. The partitions 29 within these channels control and curve the flow around so that it enters the combining structure 30 which funnels the air from the multiplicity of units 19 into the single entrance port of blower 31. This blower has the dual function of causing a slight vacuum within the combining structure 30 which assures no back or static pressure will be allowed to build up either in the exhaust channels or in or near the entrances 25 of the units 19, as well as assuring enough pressure to blow the heavily particle laden air into either a recovery area or a return area.

Although it is disclosed in the drawings that the particle laden gas passes from blower 31 through pipe 34 into a cyclone type separator 35 for final removal of the particles from the gas, it is to be understood that a bag or other type filter could be substituted for the cyclone in this step of the recovery process. Also the pipe 34 could be run either back into the drier 11 or into an adjacent storage means (not shown) for the dried product.

Figure 5:
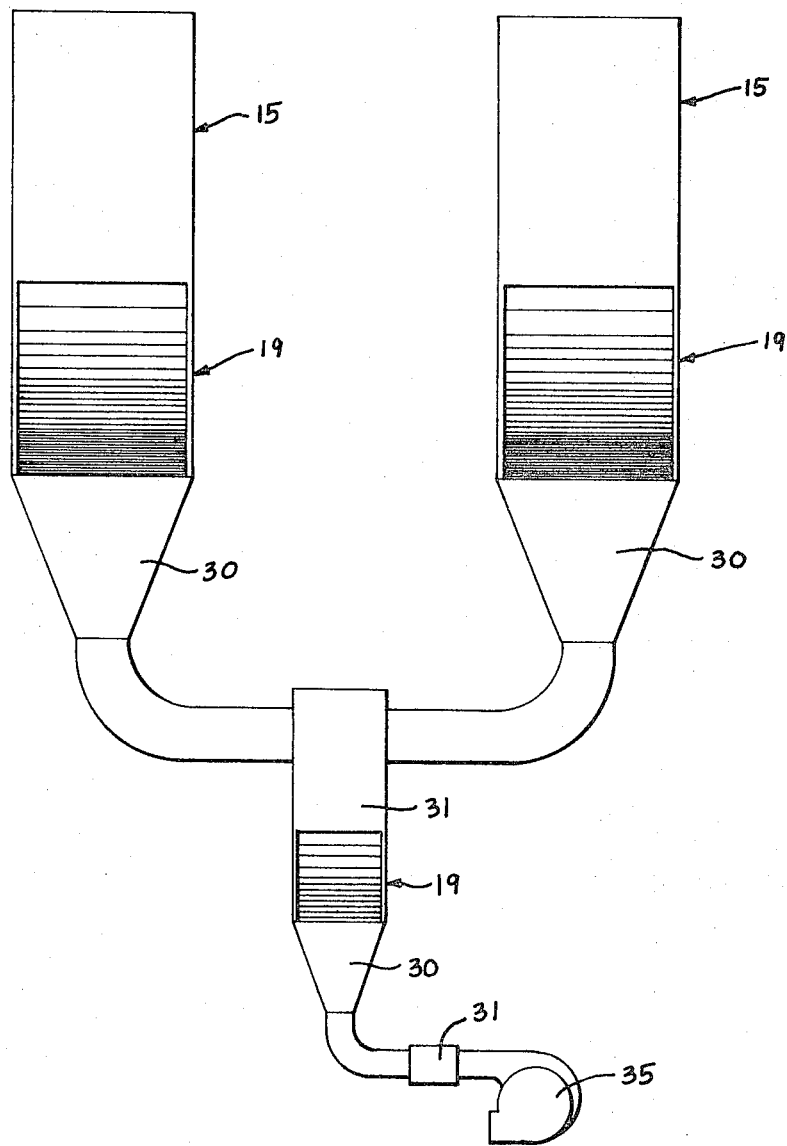
FIG. 5 is a top plan view of a multiple unit louver type filter system.

If a multiplicity of air streams are to be depolluted such as in the case of a large drying unit using multiple fans, separators 19 could be placed in each air stream and the channel members 28 leading therefrom combined to lead into the entrance 24 of the secondary separator thus forming a multiplicity of separators in series, particularly as noted in FIG. 5. The advantage of this type of arrangement is that additional air is disbursed to reduce the volume of particle laden air to the point that the particles can be finally recovered. If a cyclone type separator is the final stage in the separation process, the series arrangement will allow a much smaller cyclone to be used than would otherwise be feasible.

Obviously, if a propeller type fan were used in connection with a suction or induction type system rather than the blower type fan shown in the drawings, or if the present invention were applied to the exhaust port of a forced air type system, all of any plurality of units 19 could be made of the same size so that each would still accommodate approximately the same volume of air as each of the others.

Likewise, although the description has been primarily directed toward drying devices of various types, it is obvious that it could be used in conjunction with any system in which it is desired to remove large percentages of foreign matter from a volume of moving air.

It is obvious that the present invention has the advantage of allowing more complete removal of air borne particles from a flowing stream of air with a structural unit much smaller in size and complexity of operation than has heretofore been possible. The present invention also has the advantage of being readily adaptable to the exhaust ports of existing installations giving off highly polluted air exhaust. Additionally, the present invention is simple in construction and inexpensive in initial and operating cost while at the same time giving a much superior filtering effect.

The terms "horizontal," "upper," "lower," "bottom" and so forth have been used herein merely for convenience in the foregoing specification to describe the present invention and its parts as oriented in the drawings. It is to be understood, however, that these terms are in no way limiting since it may obviously be disposed in many different positions when in use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. An apparatus for separating particles from an air stream comprising: multiple pairs of parallely spaced impervious planar side walls; a plurality of spaced horizontal impervious planar tapering walls each extending between a pair of side walls; a plurality of louvered walls each extending between a pair of side walls and coextensive with the tapering walls, each louvered wall interposed and spaced from a said tapering wall to define a plurality of channels narrowing in cross section in a down stream direction, the channels being open at their ends, each of the louver walls comprising a multiplicity of parallely spaced louvers, adjacent louvers being progressively closer together from down stream to up stream ends of such louvered walls, each louvered wall being progressively farther spaced from its corresponding adjacent tapered wall to define separating units of correspondingly increasing cross section between the side walls whereby approximately the same volume of air will enter each of the separating units even though the air stream has greater pressure in some areas than other areas.

2. The device of claim 1 wherein the louvers are curved in cross section in an arc whose radii focus is toward the smaller end of the tapered, separating apparatus.

3. The device of claim 1 wherein at least two separating apparatus are placed in series.

4. The device of claim 1 wherein a multiplicity of separating apparatus are placed in parallel and series.

5. The device of claim 1 wherein at least one air straightening means is disposed in said air stream adjacent the larger end of at least one of the separating apparatus.

6. The device of claim 1 wherein a means is provided to prevent pressure from building up adjacent the smaller end of said separating apparatus.

7. The device of claim 6 wherein the means to prevent back pressure buildup is a partial vacuum created by a fan means.

8. An apparatus for separating particles from an air stream comprising: multiple pairs of parallely spaced impervious planar side walls; a plurality of spaced horizontal impervious planar tapering walls each extending between a pair of side walls; a plurality of louvered walls each extending between a pair of side walls and coextensive with the tapering walls, each louvered wall interposed and spaced from a said tapering wall to define a plurality of channels narrowing in cross section in a down stream direction, the channels being open at their ends, each of the louver walls comprising a multiplicity of parallely spaced curved in cross section louvers, adjacent louvers being progressively closer together from down stream to up stream ends of such louvered walls, each louvered wall being progressively farther spaced from its corresponding adjacent tapered wall to define separating units of corresponding increasing cross section between the side walls whereby approximately the same volume of air will enter each of the separating units even though the air stream has greater pressure in some areas than other areas.

References Cited

UNITED STATES PATENTS

| | | | |
|---|---|---|---|
| 375,983 | 1/1888 | Boehning | 55—443 |
| 1,994,049 | 3/1935 | Saint-Jacques | 209—144 |
| 2,076,815 | 4/1937 | Fulweiler. | |
| 2,087,789 | 7/1937 | Allardice | 55—343 |
| 2,152,115 | 3/1939 | Van Tongeren. | |
| 2,182,862 | 12/1939 | Allardice | 55—442 |
| 2,462,797 | 2/1949 | Whittaker | 55—416 |
| 2,506,273 | 5/1950 | Linderoth. | |
| 2,819,890 | 1/1958 | Rosa et al. | 55—443 |
| 2,853,151 | 9/1958 | Guldemond. | |
| 3,155,474 | 11/1964 | Sexton | 55—442 |
| 3,240,335 | 3/1966 | Vandenhock | 55—443 |
| 3,355,864 | 12/1967 | Sobeck | 55—443 |
| 3,369,349 | 2/1968 | Farr | 55—442 |

FOREIGN PATENTS 662,072   11/1951   Great Britain.

FRANK W. LUTTER, Primary Examiner
B. NOZICK, Assistant Examiner

U.S. Cl. X.R.

55—439, 442, 459

UNITED STATES PATENT OFFICE
CERTIFICATE OF CORRECTION

Patent No. 3,538,688        Dated November 10, 1970

Inventor(s) Charles P. Stanley, Jr., et al.

It is certified that error appears in the above-identified patent and that said Letters Patent are hereby corrected as shown below:

In the heading to the drawing Sheets 1 to 5, and in the heading to the printed specification, title of invention, "LOWER FILTER ASSEMBLY", each occurrence, should read -- LOUVER FILTER ASSEMBLY --.

Signed and sealed this 13th day of April 1971.

(SEAL)
Attest:

EDWARD M. FLETCHER, JR.　　　　　　　　WILLIAM E. SCHUYLER,
Attesting Officer　　　　　　　　　　　　Commissioner of Pate